US011149825B1

(12) United States Patent
Heinbuch et al.

(10) Patent No.: US 11,149,825 B1
(45) Date of Patent: Oct. 19, 2021

(54) ENGINE ASSEMBLY INCLUDING GEARBOX FOR VARYING COMPRESSION RATIO OF ENGINE ASSEMBLY USING STATIONARY ACTUATOR

(71) Applicant: GM GLOBAL TECHNOLOGY OPERATIONS LLC, Detroit, MI (US)

(72) Inventors: Ryan M. Heinbuch, Commerce Township, MI (US); Dumitru Puiu, Sterling Heights, MI (US); Justin E. Ketterer, LaSalle (CA); Venu G. Ganti, Troy, MI (US); Rodney E. Baker, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/850,461

(22) Filed: Apr. 16, 2020

(51) Int. Cl.
| | | |
|---|---|---|
| F16H 3/66 | (2006.01) | |
| F16H 57/08 | (2006.01) | |
| F02B 75/04 | (2006.01) | |
| F16H 48/11 | (2012.01) | |
| F02B 65/00 | (2006.01) | |
| F16H 48/36 | (2012.01) | |
| F16H 3/44 | (2006.01) | |

(52) U.S. Cl.
CPC ............... *F16H 3/66* (2013.01); *F02B 75/04* (2013.01); *F16H 57/08* (2013.01); *F02B 65/00* (2013.01); *F16H 48/11* (2013.01); *F16H 2003/442* (2013.01); *F16H 2048/364* (2013.01); *F16H 2200/2007* (2013.01); *F16H 2200/2097* (2013.01)

(58) Field of Classification Search
CPC ............... F16H 3/66; F16H 2200/2007; F16H 2200/2097; F16H 2048/3064; F16H 2003/442; F02B 65/00; F02B 75/04
USPC ............................................. 475/5, 340, 342
See application file for complete search history.

(56) References Cited

U.S. PATENT DOCUMENTS

| 4,535,730 A | * | 8/1985 | Allen ..................... F02B 75/048 123/48 B |
| 8,864,613 B2 | * | 10/2014 | Morrow ................. B60K 6/543 475/5 |
| 2004/0198551 A1 | * | 10/2004 | Joe ........................ B60W 10/08 477/3 |

(Continued)

OTHER PUBLICATIONS

U.S. Appl. No. 16/266,809, filed Feb. 4, 2019, Heinbuch et al.
U.S. Appl. No. 16/375,423, filed Apr. 4, 2019, Gautier et al.

*Primary Examiner* — Roger L Pang
(74) *Attorney, Agent, or Firm* — Harness, Dickey & Pierce, P.L.C.

(57) ABSTRACT

An engine assembly includes a crankshaft, a control shaft, a drive gear fixed to the crankshaft, a carrier, a first planetary gear set, an actuator, and a second planetary gear set. The first planetary gear set includes a first sun gear fixed to ground, a first ring gear engaged with the drive gear, and a first planet gear rotatably mounted on the carrier and engaged with the first ring gear and the first sun gear. The second planetary gear set includes a second sun gear fixed to the actuator, a second ring gear coupled with the control shaft, and a second planet gear rotatably mounted on the carrier and engaged with the second ring gear and the second sun gear. The actuator is operable to rotate the second sun gear and thereby adjust a ratio of a rotational speed of the crankshaft to a rotational speed of the control shaft.

20 Claims, 5 Drawing Sheets

(56) References Cited

U.S. PATENT DOCUMENTS

| | | | |
|---|---|---|---|
| 2008/0039259 A1* | 2/2008 | Maguire | B60L 15/2054 475/5 |
| 2010/0078238 A1* | 4/2010 | Oba | B60W 30/19 180/65.225 |
| 2015/0273998 A1* | 10/2015 | Kiyokami | B60L 15/2009 475/5 |
| 2016/0168995 A1* | 6/2016 | Baker, Jr. | F04B 9/045 92/61 |
| 2019/0032553 A1* | 1/2019 | Sokalski | F04B 1/07 |

* cited by examiner

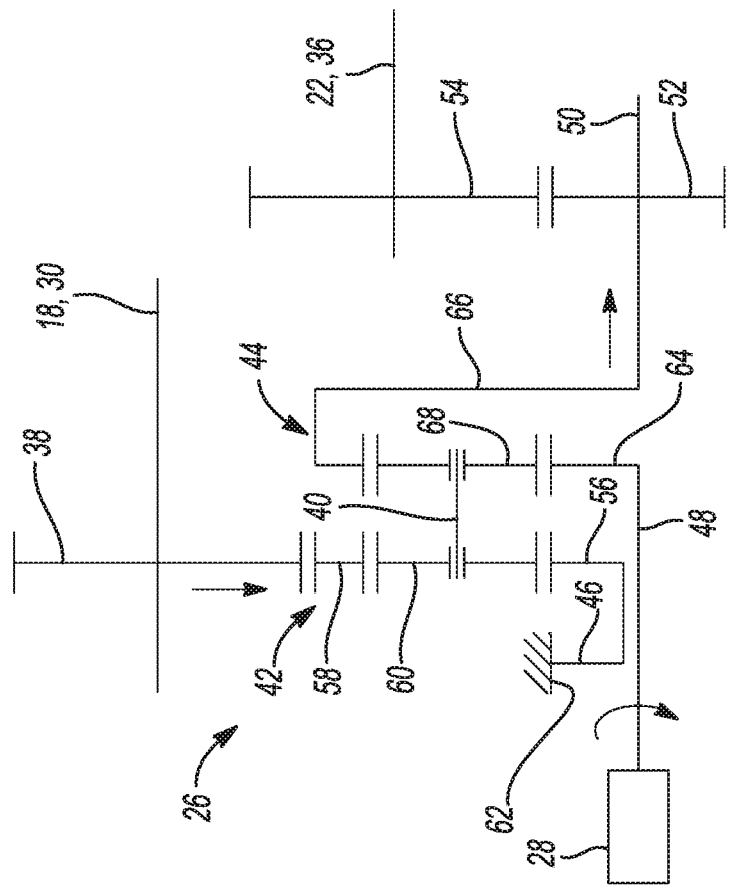
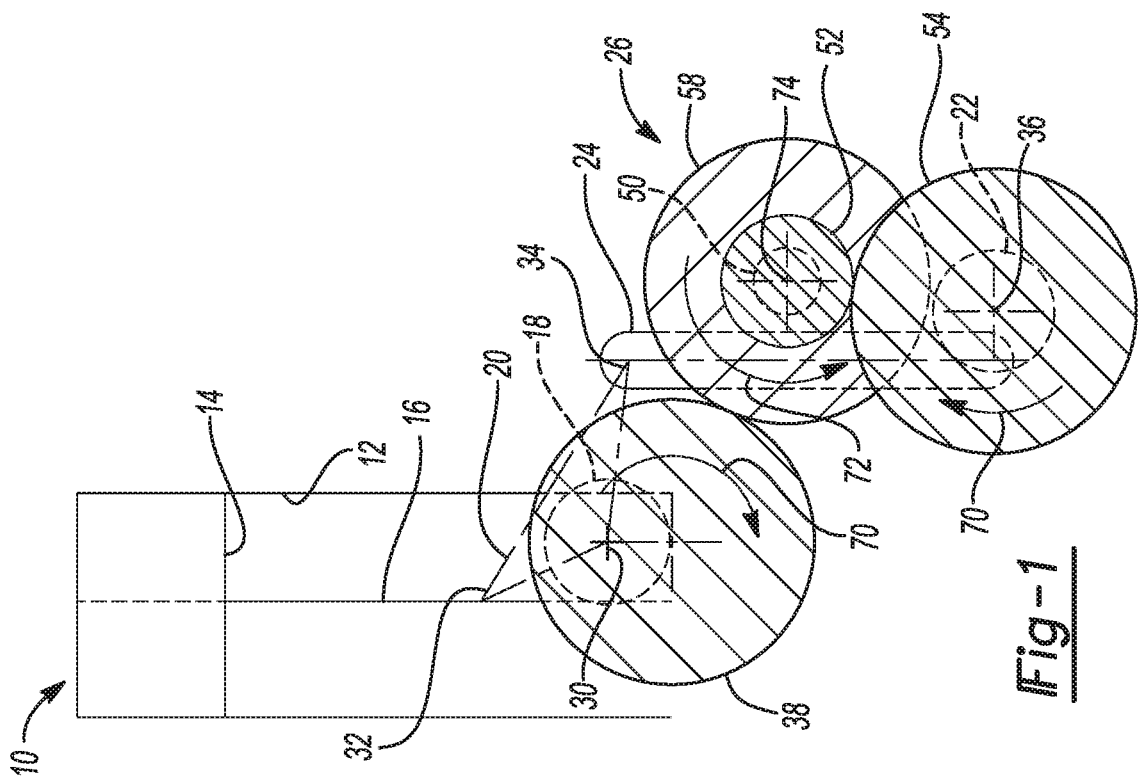
Fig-2
Fig-1

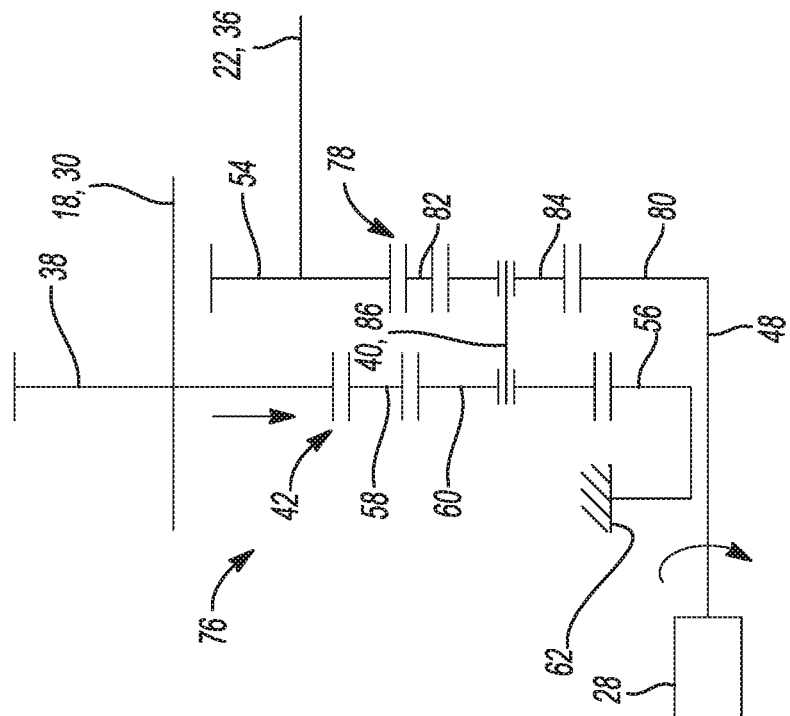
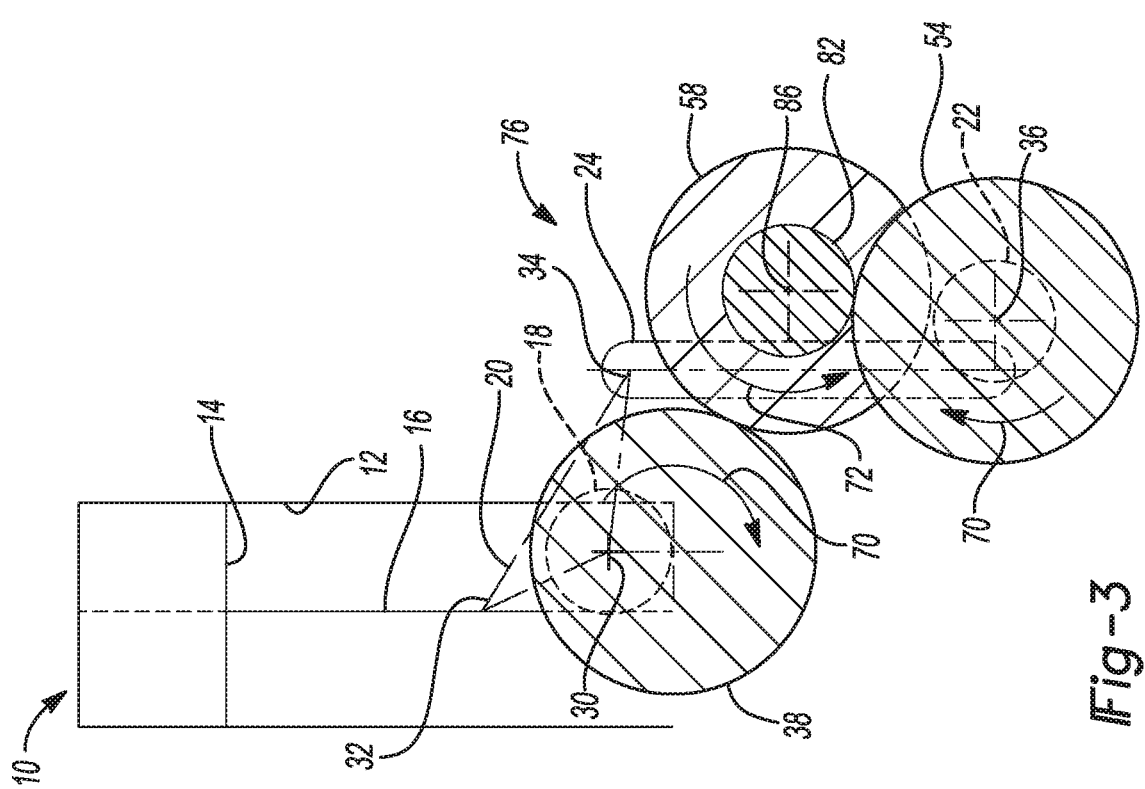

ENGINE ASSEMBLY INCLUDING GEARBOX FOR VARYING COMPRESSION RATIO OF ENGINE ASSEMBLY USING STATIONARY ACTUATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to engine assemblies including a gearbox for varying the compression ratio of the engine assemblies using a stationary actuator.

A variable compression ratio (VCR) engine typically includes an engine block defining a cylinder, a piston disposed within the cylinder, a connecting rod, a crankshaft, a bell crank, a control link, a control shaft, and a gearbox. The bell crank is pivotally mounted on the crankshaft. The connecting rod connects the piston to one end of the bell crank. The control link connects the other end of the bell crank to the control shaft.

As the piston translates within the cylinder, the connecting rod applies a torque to the bell crank, and the control link transfers the torque from the bell crank to the control shaft, which causes the control shaft to rotate. The gearbox transfers torque from the control shaft back to the crankshaft and ensures that rotation of the two shafts is in time (or in phase). In addition, the gearbox couples an actuator, such as an electric motor, to the control shaft. The electric motor is operable to vary the speed of the control shaft relative to the speed of the crankshaft, and thereby vary the compression ratio of the cylinder.

SUMMARY

A first example of an engine assembly according to the present disclosure includes a crankshaft, a bell crank, a connecting rod, a control shaft, a control link, a first drive gear, a carrier, a first planetary gear set, an actuator, and a second planetary gear set. The bell crank is pivotally mounted on the crankshaft. The bell crank has a first end and a second end opposite of the first end. The connecting rod is connected to the first end of the bell crank. The control link is mounted on the control shaft and is connected to the second end of the bell crank. The first drive gear is fixed to the crankshaft. The first planetary gear set includes a first sun gear fixed to ground, a first ring gear engaged with the first drive gear, and a first planet gear rotatably mounted on the carrier and engaged with the first ring gear and the first sun gear. The second planetary gear set includes a second sun gear fixed to the actuator, a second ring gear coupled with the control shaft, and a second planet gear rotatably mounted on the carrier and engaged with the second ring gear and the second sun gear. The actuator is operable to rotate the second sun gear and thereby adjust a ratio of a rotational speed of the crankshaft to a rotational speed of the control shaft.

In one example, the engine assembly further includes a transfer shaft fixed to the second ring gear, a second drive gear fixed to the transfer shaft, and a driven gear fixed to the control shaft and engaged with the second drive gear.

In one example, when the actuator does not rotate the second sun gear, a ratio of a rotational speed of the crankshaft to a rotational speed of the transfer shaft is one-to-one.

In one example, the engine assembly further includes a driven gear fixed to the control shaft and engaged with the second ring gear.

In one example, when the actuator does not rotate the second sun gear, a ratio of a rotational speed of the crankshaft to a rotational speed of the carrier is one-to-one.

In one example, the actuator rotates independent of the carrier.

In one example, the second planet gear is coaxial with the first planet gear.

In one example, the first planet gear has a first diameter, and the second planet gear has a second diameter that is equal to the first diameter.

In one example, the first ring gear has a first diameter, and the second ring gear has a second diameter that is less than the first diameter.

A second example of an engine assembly according to the present disclosure includes a crankshaft, a bell crank, a connecting rod, a control shaft, a control link, a first drive gear, an actuator, and a planetary gear set. The bell crank has a first end and a second end opposite of the first end. The connecting rod is mounted on the crankshaft and is connected to the first end of the bell crank. The control link is mounted on the control shaft and is connected to the second end of the bell crank. The first drive gear is fixed to the crankshaft. The planetary gear set includes a sun gear fixed to the actuator, a ring gear engaged with the first drive gear, a carrier fixed to the control shaft, a first plurality of planet gears rotatably mounted on the carrier and engaged with the sun gear, and a second plurality of planet gears rotatably mounted on the carrier and engaged with the first plurality of planet gears and the ring gear. The actuator is operable to rotate the sun gear and thereby adjust a ratio of a rotational speed of the crankshaft to a rotational speed of the control shaft.

In one example, each gear in the second plurality of planet gears is engaged with one gear in the first plurality of planet gears.

In one example, the first plurality of planet gears are not engaged with the ring gear.

In one example, the second plurality of planet gears are not engaged with the sun gear.

In one example, when the actuator does not rotate the sun gear, the ratio of the rotational speed of the crankshaft to the rotational speed of the control shaft is two-to-one.

In one example, the actuator rotates independent of the carrier.

A third example of an engine assembly according to the present disclosure includes a crankshaft, a control shaft, a drive gear fixed to the crankshaft, an actuator, and a planetary gear set. The planetary gear set includes a sun gear fixed to the actuator, a first ring gear engaged with the drive gear, a carrier, a plurality of planet gears rotatably mounted on the carrier and engaged with the sun gear and the first ring gear, and a second ring gear fixed to the control shaft and engaged with the plurality of planet gears. The actuator is operable to rotate the sun gear and thereby adjust a ratio of a rotational speed of the crankshaft to a rotational speed of the control shaft.

In one example, the second ring gear is not engaged with the drive gear.

In one example, the first ring gear has a first number of teeth, and the second ring gear has a second number of teeth that is greater than the first number of teeth.

In one example, the first ring gear has a first number of teeth, and the second ring gear has a second number of teeth that is less than the first number of teeth.

In one example, the actuator rotates independent of the carrier.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a section view of an engine assembly including a first example gearbox according to the principles of the present disclosure;

FIG. 2 is a schematic view of the first example gearbox;

FIG. 3 is a section view of an engine assembly including a second example gearbox according to the principles of the present disclosure;

FIG. 4 is a schematic view of the second example gearbox;

In the drawings, reference numbers may be reused to identify similar and/or identical elements.

DETAILED DESCRIPTION

Figure 6:
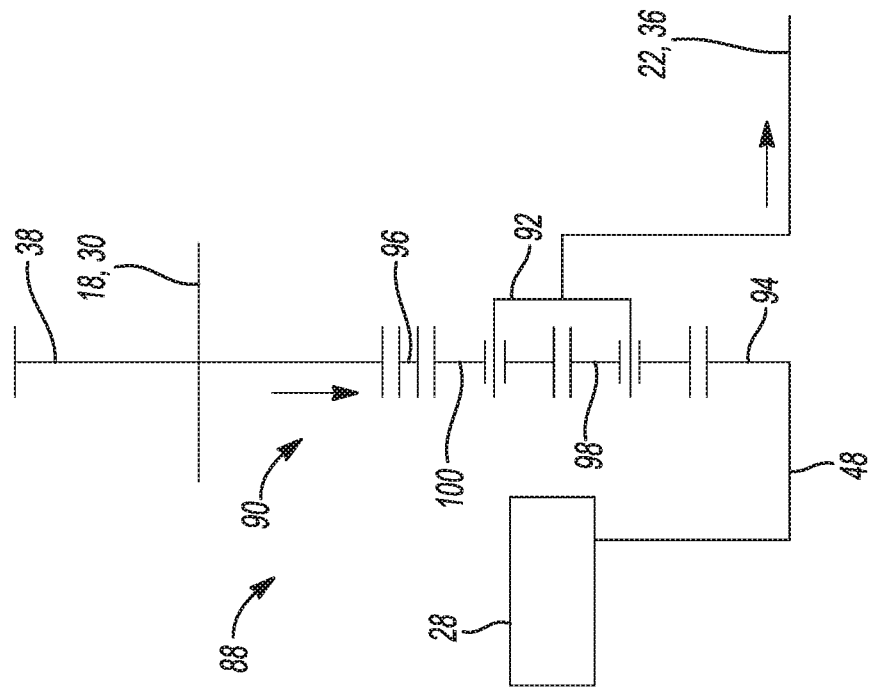
FIG. 6 is a schematic view of the third example gearbox.

The gearbox of a VCR engine typically includes a drive gear fixed to the crankshaft, a driven gear fixed to the control shaft, a first gear mounted on a transfer shaft (or carrier), and a second gear fixed to the transfer shaft (or carrier). The first gear is engaged with the drive gear, and the second gear is engaged with the driven gear In addition, the electric motor of the VCR engine (or a shaft of the electric motor) is typically fixed to the transfer shaft (or carrier) so that the electric motor rotates with the transfer shaft.

In VCR engines such as the one described above, the electric motor may work against the full torque of the crankshaft to adjust the phasing of the control shaft relative to the crankshaft. Thus, the electric motor may need to be large in size with a high torque output, and an expensive high ratio reducer may be required to couple the electric motor to the transfer shaft. In addition, the parasitic losses of such a VCR engine is high.

To address the above issues, a VCR engine according to the present disclosure includes a gearbox that allows the actuator to rotate independent of the transfer shaft (or carrier). The gearbox accomplishes this by providing a split power path—one power path from the crankshaft to the control shaft, and another power path from the actuator to the control shaft. With this arrangement, the actuator only works against a fraction of the crankshaft torque. Thus, the actuator may be stationary, and the actuator may be smaller than actuators that are typically used to adjust the compression ratio of a VCR engine. In addition, the parasitic losses may be much less than those of a typical VCR engine. Further, making the actuator stationary enables more precise position control and more robust diagnostics. Moreover, the arrangement enables faster shifts between phaser settings, simplifies assembly and service, and increases the lifetime of the gearbox by eliminating a slip ring (brush) connection to the electric motor and eliminating fatigue in the gearbox.

Referring now to FIGS. 1 and 2, an engine assembly 10 includes a cylinder 12, a piston 14, a connecting rod 16, a crankshaft 18, a bell crank 20, a control shaft 22, a control link 24, a gearbox 26, and an actuator 28. The piston 14 reciprocates within the cylinder 12 when an air-fuel mixture is combusted within the cylinder 12. For illustration purpose, FIG. 1 shows only one cylinder of the engine assembly 10. However, the engine assembly 10 may include additional cylinders. The engine assembly 10 may be a spark-ignition engine or a compression-ignition engine.

The bell crank 20 is mounted on the crankshaft 18 in a manner that allows the bell crank 20 to pivot about a rotational axis 30 of the crankshaft 18. The bell crank 20 has a first end 32 and a second end 34 opposite of the first end 32. The bell crank 20 may have nodes or pins for connections with the crankshaft 18, the connecting rod 16, and the control link 24, and the nodes or pins may be arranged in a T-shape, in a triangle shape, or in-line with one another.

The connecting rod 16 connects the piston 14 to the first end 32 of the bell crank 20. The connecting rod 16 may be pivotally coupled to the piston 14 and the bell crank 20 using, for example, pins (not shown). The control link 24 is mounted on the control shaft 22 in a manner that allows the control link 24 to pivot about a rotational axis 36 of the control shaft 22. The control link 24 is connected to the second end 32 of the bell crank 20. The connecting rod 16 may be pivotally coupled to the bell crank 20 using, for example, a pin (not shown).

The connecting rod 16, the bell crank 20, and the control link 24 collectively convert the translational motion of the piston 14 into rotational motion of the crankshaft 18. In other words, the connecting rod 16, the bell crank 20, and the control link 24 cause the crankshaft 18 to rotate when the piston 14 reciprocates within the cylinder 12. As the piston 14 reciprocates within the cylinder 12, the connecting rod 16 pivots (e.g., rocks back and forth) about the first end 32 of the bell crank 20. The pivoting motion of the connecting rod 16 causes the bell crank 20 to pivot (e.g., rock back and forth) about the rotational axis 30 of the crankshaft 18. The pivoting motion of the bell crank 20 causes the control link 24 to pivot (e.g., rock back and forth) about the rotational axis 36 of the control shaft 22.

The gearbox 26 synchronizes rotation of the crankshaft 18 with rotation of the control shaft 22. In addition, the gearbox 26 connects the actuator 28 to the control shaft 22 in a manner that allows the actuator 28 to vary the speed of the control shaft 22 relative to the speed of the crankshaft 18 while the actuator 28 (or a body thereof) is stationary. Varying the speed of the control shaft 22 relative to the speed of the crankshaft 18 varies the stroke and top dead center (TDC) position of the piston 14, which varies the compression ratio of the engine assembly 10.

The gearbox 26 includes a first drive gear 38, a carrier 40, a first planetary gear set 42, a second planetary gear set 44, a ground shaft 46, an actuator shaft 48, a transfer shaft 50, a second drive gear 52, and a driven gear 54. The first drive gear 38 is fixed to the crankshaft 18 using, for example, a spline connection, and therefore the first drive gear 38 rotates with the crankshaft 18. The first and second planetary gear sets 42 and 44 may be symmetric with respect to a line of symmetry extending through the actuator shaft 48 and/or the transfer shaft 50. Thus, while FIG. 2 shows only one half of each of the first and second planetary gear sets 42 and 44, the other halves of the first and second planetary gear sets 42 and 44 may be identical to the halves shown.

The first planetary gear set 42 includes a first sun gear 56, a first ring gear 58, and one or more first planet gears 60. The first sun gear 56 is fixed (e.g., fastened) to a ground 62 (e.g., a housing of the gearbox 26). The ground shaft 46 connects the first sun gear 56 to the ground 62. The first ring gear 58 is engaged with the first drive gear 38. The first planet gears 60 are rotatably mounted on the carrier 40. The first planet gears 60 are engaged with the first ring gear 58 and the first sun gear 56. Each first planet gear 60 has a first diameter.

The second planetary gear set 44 includes a second sun gear 64, a second ring gear 66, and one or more second planet gears 68. The second sun gear 64 is fixed to the actuator 28. The actuator shaft 48 may connect a rotating component (e.g., a shaft) within the actuator 28 to the second sun gear 64. Alternatively, the actuator shaft 48 may be the rotating component of the actuator 28 fixed to the second sun gear 64.

The second ring gear 66 is fixed (e.g., splined) to the transfer shaft 50. The second planet gears 68 are rotatably mounted on the carrier 40. Each second planet gear 68 may be coaxial with one of the first planet gears 60. The second planet gears 68 are engaged with the second ring gear 66 and the second sun gear 64. Each second planet gear 68 has a second diameter that is equal to the first diameter of each first planet gear 60. The second drive gear 52 is fixed (e.g., splined) to the transfer shaft 50. The driven gear 54 is fixed (e.g., splined) to the control shaft 22. The driven gear 54 is engaged with the second drive gear 52. Thus, the second ring gear 66 is coupled to the control shaft 22 via the transfer shaft 50, the second drive gear 52, and the driven gear 54.

When the crankshaft 18 rotates in a first (e.g., clockwise) direction 70, the engagement between the first drive gear 38 and the first ring gear 58 causes the first ring gear 58 to rotate in a second (e.g., counterclockwise) direction 72. When the first ring gear 58 rotates in the second direction 72, the coupling between the first ring gear 58 and the transfer shaft 50 causes the transfer shaft 50 to rotate in the second direction 72 about a rotational axis 74 of the transfer shaft 50. When the transfer shaft 50 rotates in the second direction 72, the engagement between the second drive gear 52 and the driven gear 54 causes the driven gear 54 to rotate in the first direction 70. Since the driven gear 54 is fixed to the control shaft 22, the control shaft 22 rotates in the first direction 70 with the driven gear 54.

The actuator 28 is operable to rotate the second sun gear 64 and thereby adjust the ratio of the rotational speed of the crankshaft 18 to the rotational speed of the control shaft 22. The actuator 28 may include a body or frame that is fixed (e.g. fastened) to the ground 62, a shaft configured to rotate relative to body or frame, and an electric motor (e.g., a brushless direct current motor) operable to rotate the shaft.

The actuator 28 (or the shaft of the actuator 28) rotates independent of the carrier 40 and other components of the gearbox 26. In other words, the entire actuator 28 does not rotate with the carrier 40, and the carrier 40 does not drive rotation of the actuator 28 (or the shaft of the actuator 28). Rather, the body or frame of the actuator 28 is stationary (e.g., fixed relative to the ground 62), and the electric motor of the actuator 28 rotates the shaft of the actuator 28 independent of rotation of the carrier 40.

The actuator 28 may also include a control module, a cycloidal drive, and/or a position sensor. The control module controls the electric motor to adjust the speed and/or direction of the actuator shaft, and thereby adjusts the compression ratio of the engine assembly 10, based on engine operating conditions. The cycloidal drive couples the electric motor to the actuator shaft. The position sensor measures the position of the actuator shaft and outputs the actuator shaft position to the control module. The control module may determine the speed and/or direction of the actuator shaft based on the actuator shaft position and use the determined speed/direction to perform closed-loop control of the actuator shaft speed/direction.

The gearbox 26 transfers power (and torque) from the crankshaft 18 to the control shaft 22, and from the control shaft 22 to the crankshaft 18, via a first path. The first path flows through the first drive gear 38, the first ring gear 58, the first planet gears 60, the carrier 40, the second planet gears 68, the second ring gear 66, the second drive gear 52, and the driven gear 54. The gearbox 26 also transfers power (and torque) from the actuator 28 to the control shaft 22 via a second path. The second path flows through the second sun gear 64, the second planet gear 68, the second ring gear 66, the second drive gear 52, and the driven gear 54. Thus, portions of the first and second flow paths overlap.

The actuator 28 may decrease the speed of the control shaft 22 relative to the speed of the crankshaft 18 by rotating the actuator shaft 48 and the second sun gear 64 in the same direction as the crankshaft 18 (e.g., in the first direction 70). Decreasing the speed of the control shaft 22 relative to the speed of the crankshaft 18 may be referred to as a negative phase shift. The actuator 28 may increase the speed of the control shaft 22 relative to the speed of the crankshaft 18 by rotating the actuator shaft 48 and the second sun gear 64 in an opposite direction than the crankshaft 18 (e.g., in the second direction 72). Increasing the speed of the control shaft 22 relative to the speed of the crankshaft 18 may be referred to as a positive phase shift. When the actuator 28 does not rotate the second sun gear 64, a ratio of the rotational speed of the crankshaft 18 to the rotational speed of the transfer shaft 50 is one-to-one.

Referring now to FIGS. 3 and 4, the engine assembly 10 is shown with a gearbox 76 in place of the gearbox 26. The gearbox 76 is similar or identical to the gearbox 26 except that the gearbox 76 includes a second planetary gear set 78 in place of the second planetary gear set 44, and the gearbox 76 does not include the transfer shaft 50 or the second drive gear 52. The second planetary gear set 78 may be symmetric with respect to a line of symmetry extending through the actuator shaft 48. Thus, while FIG. 4 shows only one-half of the second planetary gear set 78, the other half of the second planetary gear set 78 may be identical to the half shown.

The second planetary gear set 78 includes a second sun gear 80, a second ring gear 82, and one or more second planet gears 84. The second sun gear 80 is fixed to the actuator 28. The actuator shaft 48 may connect a rotating component (e.g., a shaft) within the actuator 28 to the second sun gear 80. Alternatively, the actuator shaft 48 may be the rotating component of the actuator 28 fixed to the second sun gear 80.

The second planet gears 84 are rotatably mounted on the carrier 40. Each second planet gear 84 may be coaxial with one of the first planet gears 60. The second planet gears 84 are engaged with the second ring gear 82 and the second sun gear 80. Each second planet gear 84 has a second diameter that is less than the first diameter of each first planet gear 60. The second ring gear 82 is engaged with the driven gear 54 which, as discussed above, is fixed to the control shaft 22. Thus, the second ring gear 82 is coupled to the control shaft 22 via the driven gear 54 alone. Since the second ring gear 82 is directly engaged with the driven gear 54, the transfer shaft 50 and the second drive gear 52 may be omitted, which reduces the complexity of the gearbox 76 and reduces the packaging space required by the gearbox 76.

When the crankshaft 18 rotates in the first direction 70, the engagement between the first drive gear 38 and the first ring gear 58 causes the first ring gear 58 to rotate in the second direction 72. When the first ring gear 58 rotates in the second direction 72, the coupling between the first ring gear 58 and the second ring gear 82 causes the second ring gear 82 to rotate in the second direction 72 about a rotational axis 86. When the second ring gear 82 rotates in the second direction 72, the engagement between the second ring gear 82 and the driven gear 54 causes the driven gear 54 to rotate in the first direction 70. Since the driven gear 54 is fixed to the control shaft 22, the control shaft 22 rotates in the first direction 70 with the driven gear 54.

The gearbox 26 transfers power (and torque) from the crankshaft 18 to the control shaft 22, and from the control shaft 22 to the crankshaft 18, via a first path. The first path flows through the first drive gear 38, the first ring gear 58, the first planet gears 60, the carrier 40, the second planet gears 84, the second ring gear 82, and the driven gear 54. The gearbox 26 also transfers power (and torque) from the actuator 28 to the control shaft 22 via a second path. The second path flows through the second sun gear 80, the second planet gear 84, the second ring gear 82, and the driven gear 54. Thus, portions of the first and second flow paths overlap.

The actuator 28 (or the shaft of the actuator 28) rotates independent of the carrier 40 and other components of the gearbox 76. In other words, the entire actuator 28 does not rotate with the carrier 40, and the carrier 40 does not drive rotation of the actuator 28 (or the shaft of the actuator 28). Rather, the body or frame of the actuator 28 is stationary (e.g., fixed relative to the ground 62), and the electric motor of the actuator 28 rotates the shaft of the actuator 28 independent of rotation of the carrier 40.

The actuator 28 is operable to rotate the second sun gear 80 and thereby adjust the ratio of the rotational speed of the crankshaft 18 to the rotational speed of the control shaft 22. The actuator 28 may decrease the speed of the control shaft 22 relative to the speed of the crankshaft 18 by rotating the actuator shaft 48 and the second sun gear 80 in the same direction as the crankshaft 18 (e.g., in the first direction 70). The actuator 28 may increase the speed of the control shaft 22 relative to the speed of the crankshaft 18 by rotating the actuator shaft 48 and the second sun gear 80 in an opposite direction than the crankshaft 18 (e.g., in the second direction 72). When the actuator 28 does not rotate the second sun gear 80, a ratio of the rotational speed of the crankshaft 18 to the rotational speed of the carrier 40 is one-to-one.

Figure 5:
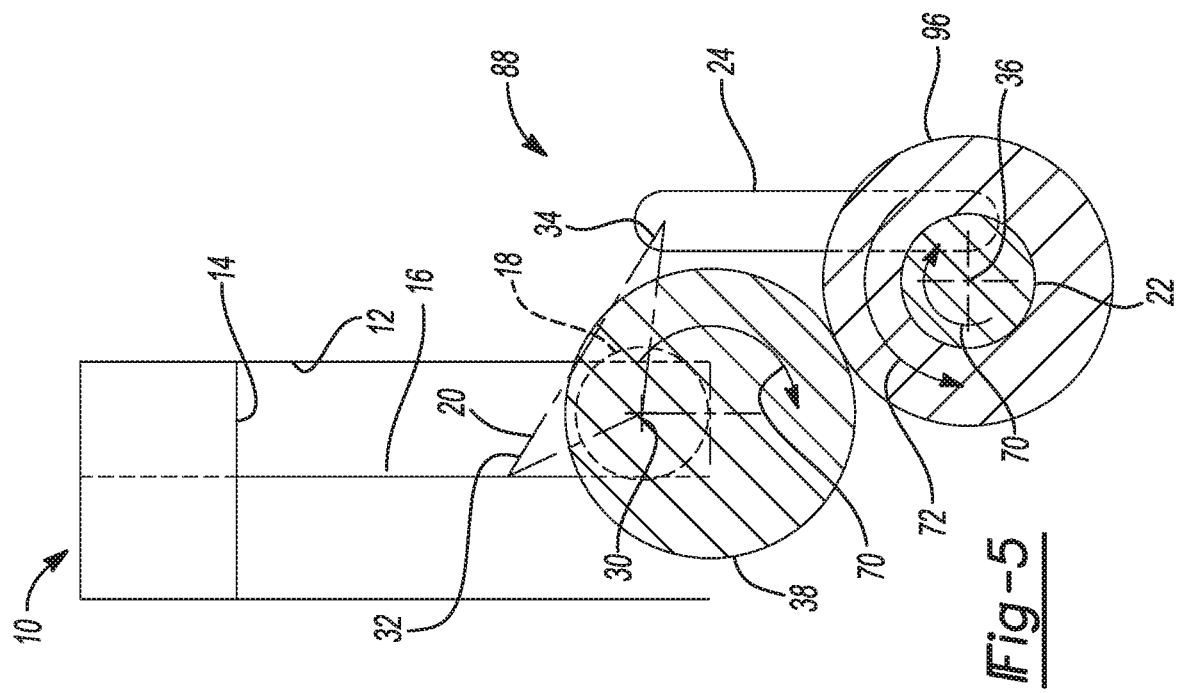
FIG. 5 is a section view of an engine assembly including a third example gearbox according to the principles of the present disclosure.
Figure 7:
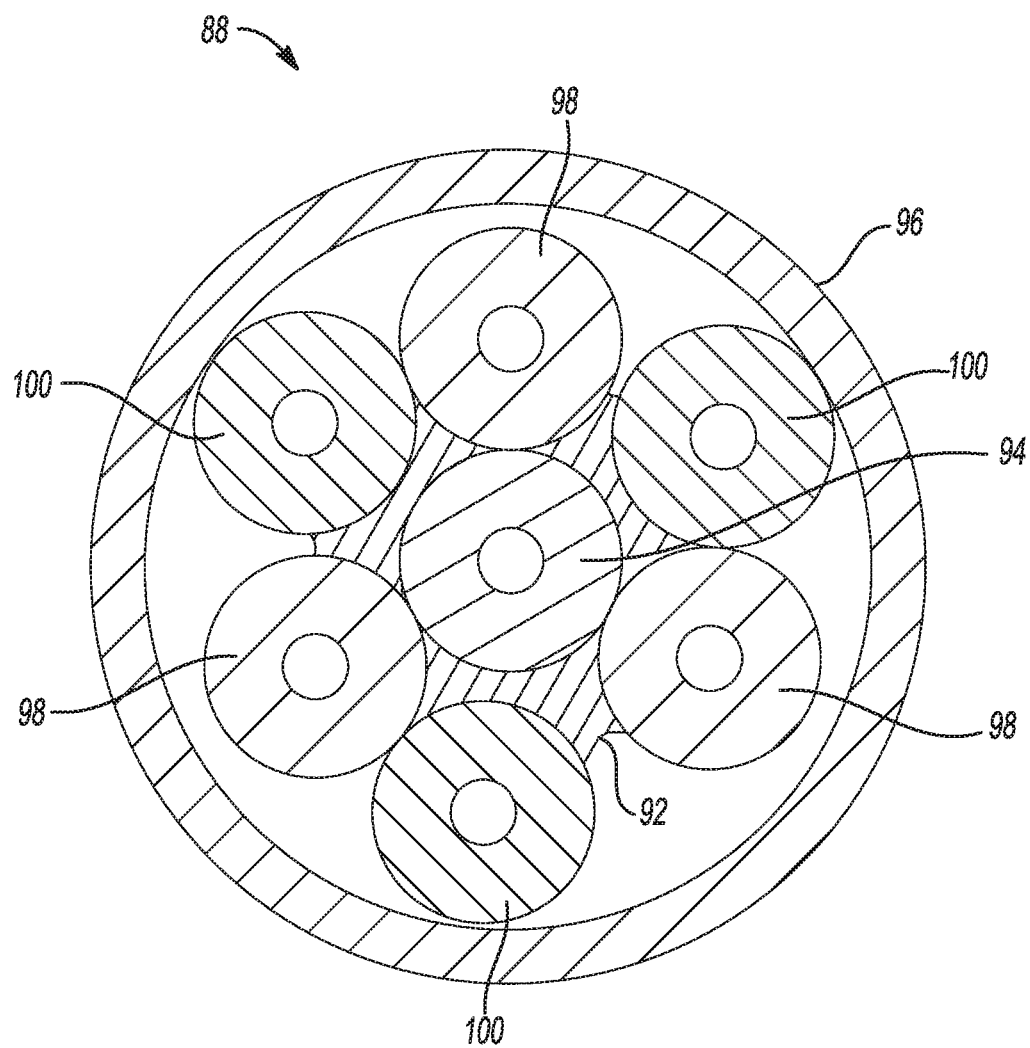
FIG. 7 is a plan view of the third example gearbox.

Referring now to FIGS. 5 through 7, the engine assembly 10 is shown with a gearbox 88 in place of the gearbox 76. The gearbox 88 includes a compound planetary gear set 90 and a carrier 92. The planetary gear set 90 may be symmetric with respect to a line of symmetry extending through the actuator shaft 48. Thus, while FIG. 6 shows only one-half of the planetary gear set 90, the other half of the planetary gear set 90 may be identical to the half shown.

The planetary gear set 90 includes a sun gear 94, a ring gear 96, a plurality of first planet gears 98, and a plurality of second planet gears 100. The sun gear 94 is fixed to the actuator 28. The actuator shaft 48 may connect a rotating component (e.g., a shaft) within the actuator 28 to the sun gear 94. Alternatively, the actuator shaft 48 may be the rotating component of the actuator 28 fixed to the sun gear 94. The ring gear 96 is engaged with the first drive gear 38.

The first and second planet gears 98 and 100 are rotatably mounted on the carrier 92. The first planet gears 98 are engaged with the sun gear 94 and are not engaged with the ring gear 96. Each first planet gear 98 has a first diameter. The second planet gears 100 are engaged with the ring gear 96 and are not engaged with the sun gear 94. In addition, each second planet gear 100 is engaged with one of the first planet gears 98. Each second planet gear 100 has a second diameter, which may be equal to or different than the first diameter of each first gear 98.

The carrier 92 is fixed to the control shaft 22 and couples the first and second planet gears 98 and 100 to the control shaft 22. When the crankshaft 18 rotates in the first direction 70, the engagement between the first drive gear 38 and the ring gear 96 causes the ring gear 96 to rotate in the second direction 72. When the ring gear 96 rotates in the second direction 72, the coupling between the ring gear 96 and the control shaft 22 causes the control shaft 22 to rotate in the first direction about the rotational axis 36.

The gearbox 88 transfers power (and torque) from the crankshaft 18 to the control shaft 22 via a first path. The first path flows through the first drive gear 38, the ring gear 96, the first and second planet gears 98 and 100, and the carrier 92. The gearbox 26 also transfers power (and torque) from the actuator 28 to the control shaft 22 via a second path. The second path flows through the sun gear 94, the first and second planet gears 98 and 100, and the carrier 92. Thus, portions of the first and second flow paths overlap.

The actuator 28 is operable to rotate the sun gear 94 and thereby adjust the ratio of the rotational speed of the crankshaft 18 to the rotational speed of the control shaft 22. The actuator 28 may decrease the speed of the control shaft 22 relative to the speed of the crankshaft 18 by rotating the actuator shaft 48 and the sun gear 94 in the same direction as the crankshaft 18 (e.g., in the first direction 70). The actuator 28 may increase the speed of the control shaft 22 relative to the speed of the crankshaft 18 by rotating the actuator shaft 48 and the sun gear 94 in an opposite direction than the crankshaft 18 (e.g., in the second direction 72).

When the actuator 28 does not rotate the sun gear 94, a ratio of the rotational speed of the crankshaft 18 to the rotational speed of the control shaft 22 is two-to-one. Thus, the gearbox 88 may be configured to achieve piston motion that is consistent with the Atkinson cycle. For example, the gearbox 88 may be configured such that the exhaust stroke of the piston 14 is longer than the intake stroke of the piston 14, and the expansion stroke of the piston 14 is longer than the compression stroke of the piston 14. In turn, the efficiency of the engine assembly 10 may be increased.

Figure 8:
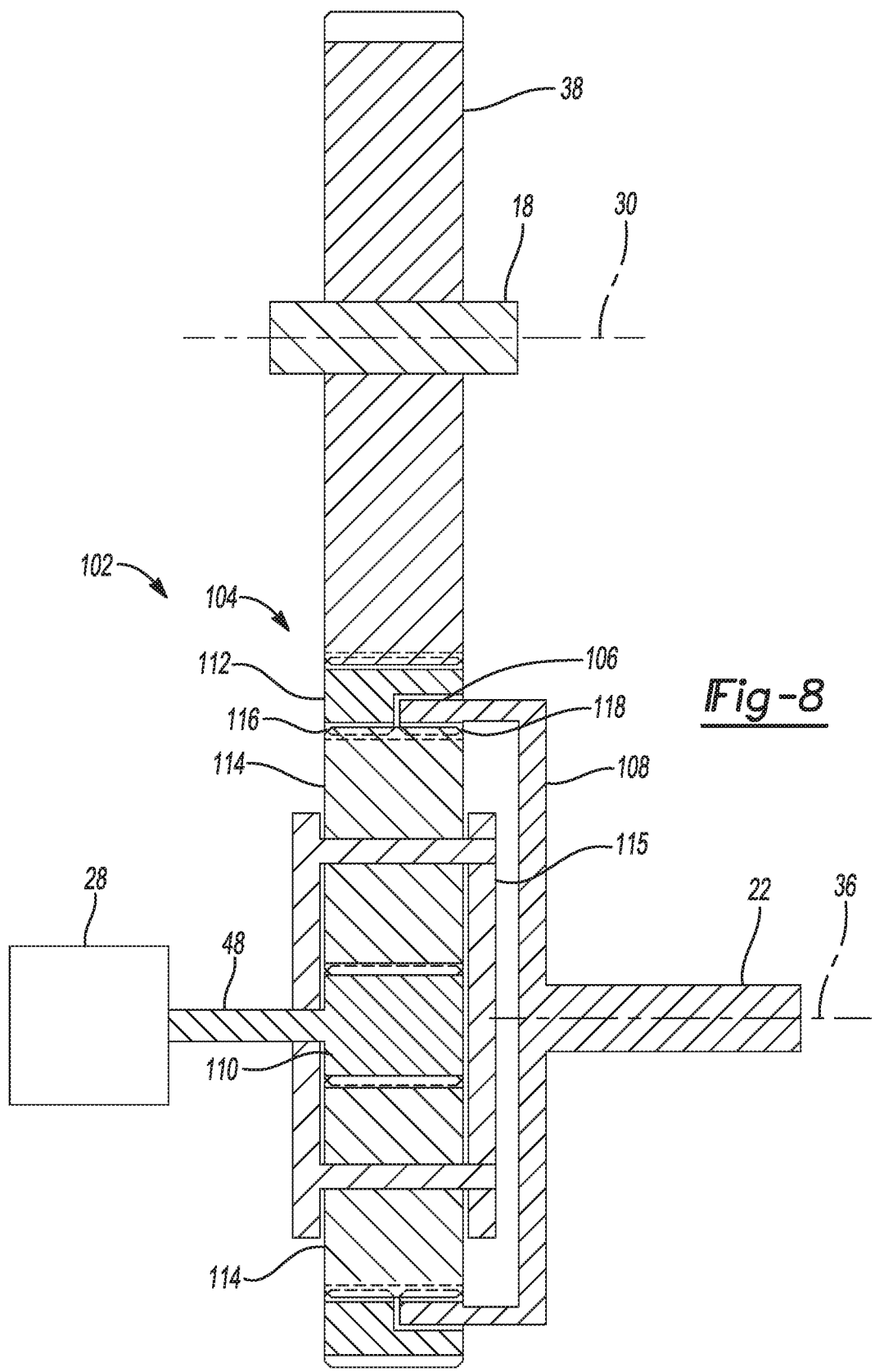
FIG. 8 is a section view of a fourth example gearbox according to the principles of the present disclosure.

Referring now to FIG. 8, the engine assembly 10 may include a gearbox 102 in place of any of the other gearboxes described herein. The gearbox 102 includes a planetary gear set 104, a second ring gear 106, and a connecting bracket 108. The planetary gear set 104 couples the first drive gear 38 and the actuator shaft 48 (or the actuator shaft 48) to the second ring gear 106. The connecting bracket 108 connects the second ring gear 106 to the control shaft 22.

The planetary gear set 104 includes a sun gear 110, a first ring gear 112, a plurality of planet gears 114, and a carrier 115. The sun gear 110 is fixed to the actuator 28. The actuator shaft 48 may connect a rotating component (e.g., a shaft) within the actuator 28 to the sun gear 110. Alternatively, the actuator shaft 48 may be the rotating component of the actuator 28 fixed to the sun gear 110. The planet gears 114 are rotatably mounted on the carrier 115. The planet gears 114 are engaged with the first ring gear 112 and the sun gear 110. The carrier 115 is a floating carrier, as the carrier 115 is not fixed to the control shaft 22 or the second ring gear 106 (i.e., the output ring gear). Therefore, the reaction torque of the control shaft 22 and the second ring gear 106 cannot back drive the actuator 28.

The gearbox 102 transfers power (and torque) from the crankshaft 18 to the control shaft 22 via a first path. The first path flows through the first drive gear 38, the first ring gear 112, the planet gears 114, the second ring gear 106, and the connecting bracket 108. The gearbox 102 also transfers power (and torque) from the actuator 28 to the control shaft 22 via a second path. The second path flows through the sun gear 110, the planet gears 114, the second ring gear 106, and the connecting bracket 108. Thus, portions of the first and second flow paths overlap.

The actuator 28 (or the shaft of the actuator 28) rotates independent of the carrier 115 and other components of the gearbox 102. In other words, the entire actuator 28 does not rotate with the carrier 115, and the carrier 115 does not drive rotation of the actuator 28 (or the shaft of the actuator 28). Rather, the body or frame of the actuator 28 is stationary, and the electric motor of the actuator 28 rotates the shaft of the actuator 28 independent of rotation of the carrier 40.

The actuator 28 is operable to rotate the sun gear 110 and thereby adjust the ratio of the rotational speed of the crankshaft 18 to the rotational speed of the control shaft 22. The actuator 28 may decrease the speed of the control shaft 22 relative to the speed of the crankshaft 18 by rotating the actuator shaft 48 and the sun gear 110 in the same direction as the crankshaft 18 (e.g., in the first direction 70). The actuator 28 may increase the speed of the control shaft 22 relative to the speed of the crankshaft 18 by rotating the actuator shaft 48 and the sun gear 110 in an opposite direction than the crankshaft 18 (e.g., in the second direction 72).

The first ring gear 112 has a first number of teeth 116 that engage the planet gears 114. The second ring gear 106 has a second number of teeth 118 that engage the planet gears 114. The second number can be greater than (e.g., one more) or less than (e.g., one less) than the first number, depending on the desired rotation direction of the control shaft 22 relative to the crankshaft 18 and the desired functionality of the gearbox 102. If the second number of the teeth 118 is greater than or less than the first number of the teeth 116, the ratio of the rotational speed of the crankshaft 18 to the rotational speed of the control shaft 22 may be very large or very small, respectively. For example, if the first number of the teeth 116 is 69 and the second number of the teeth 118 is 70, the ratio of the rotational speed of the crankshaft 18 to the rotational speed of the control shaft 22 may be 69 to 1.

In various implementations, the connecting bracket 108 and the carrier 115 may be combined to form a single carrier. Additionally or alternatively, the planetary gear set 104 may be a compound planetary gear set that includes both the planet gears 114 and a plurality of other planet gears (not shown) rotatably mounted on the carrier 115. In such implementations, the planet gears 114 may be engaged with the sun gear 110 and not engaged with the first or second ring gears 112 or 106, and the other planet gears may be engaged with the first and second ring gears 112 and 106 and not engaged with the sun gear 110. Alternatively, the planet gears 114 may be engaged with the first and second ring gears 112 and 106 and not engaged with the sun gear 110, and the other planet gears may be engaged with the sun gear 110 and not engaged with the first or second ring gears 112 or 106. In this regard, the arrangement of dual ring gears having a different number of teeth may be used in conjunction with a gearbox including a compound planetary gear set such as the gearbox 88 of FIGS. 5-7.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An engine assembly comprising:
   a crankshaft;
   a bell crank pivotally mounted on the crankshaft, the bell crank having a first end and a second end opposite of the first end;
   a connecting rod connected to the first end of the bell crank;
   a control shaft;
   a control link mounted on the control shaft and connected to the second end of the bell crank;
   a first drive gear fixed to the crankshaft;
   a carrier;
   a first planetary gear set including a first sun gear fixed to ground, a first ring gear engaged with the first drive gear, and a first planet gear rotatably mounted on the carrier and engaged with the first ring gear and the first sun gear;
   an actuator; and
   a second planetary gear set including a second sun gear fixed to the actuator, a second ring gear coupled with the control shaft, and a second planet gear rotatably mounted on the carrier and engaged with the second ring gear and the second sun gear, wherein the actuator is operable to rotate the second sun gear and thereby adjust a ratio of a rotational speed of the crankshaft to a rotational speed of the control shaft.

2. The engine assembly of claim 1 further comprising a transfer shaft fixed to the second ring gear, a second drive gear fixed to the transfer shaft, and a driven gear fixed to the control shaft and engaged with the second drive gear.

3. The engine assembly of claim 2 wherein when the actuator does not rotate the second sun gear, a ratio of the rotational speed of the crankshaft to a rotational speed of the transfer shaft is one-to-one.

4. The engine assembly of claim 1 further comprising a driven gear fixed to the control shaft and engaged with the second ring gear.

5. The engine assembly of claim 4 wherein when the actuator does not rotate the second sun gear, a ratio of the rotational speed of the crankshaft to a rotational speed of the carrier is one-to-one.

6. The engine assembly of claim 1 wherein the actuator rotates independent of the carrier.

7. The engine assembly of claim 1 wherein the second planet gear is coaxial with the first planet gear.

8. The engine assembly of claim 1 wherein the first planet gear has a first diameter, and the second planet gear has a second diameter that is equal to the first diameter.

9. The engine assembly of claim 1 wherein the first planet gear has a first diameter, and the second planet gear has a second diameter that is less than the first diameter.

10. An engine assembly comprising:
    a crankshaft;
    a bell crank mounted on the crankshaft, the bell crank having a first end and a second end opposite of the first end;
    a connecting rod connected to the first end of the bell crank;

a control shaft;

a control link mounted on the control shaft and connected to the second end of the bell crank;

a first drive gear fixed to the crankshaft;

an actuator; and a planetary gear set including a sun gear fixed to the actuator, a ring gear engaged with the first drive gear, a carrier, a first plurality of planet gears rotatably mounted on the carrier and engaged with the sun gear, and a second plurality of planet gears rotatably mounted on the carrier and engaged with the ring gear, wherein the actuator is operable to rotate the sun gear and thereby adjust a ratio of a rotational speed of the crankshaft to a rotational speed of the control shaft.

11. The engine assembly of claim 10 wherein:

the carrier is fixed to the control shaft; and each gear in the second plurality of planet gears is engaged with one gear in the first plurality of planet gears.

12. The engine assembly of claim 10 wherein the first plurality of planet gears are not engaged with the ring gear.

13. The engine assembly of claim 10 wherein the second plurality of planet gears are not engaged with the sun gear.

14. The engine assembly of claim 10 wherein when the actuator does not rotate the sun gear, the ratio of the rotational speed of the crankshaft to the rotational speed of the control shaft is two-to-one.

15. The engine assembly of claim 10 wherein the actuator rotates independent of the carrier.

16. An engine assembly comprising:

a crankshaft;

a bell crank pivotally mounted on the crankshaft, the bell crank having a first end and a second end opposite of the first end;

a connecting rod connected to the first end of the bell crank;

a control shaft;

a control link mounted on the control shaft and connected to the second end of the bell crank;

a drive gear fixed to the crankshaft;

an actuator; and a planetary gear set including a sun gear fixed to the actuator, a first ring gear engaged with the drive gear, a carrier, a plurality of planet gears rotatably mounted on the carrier and engaged with the sun gear, and a second ring gear coupled to the control shaft and engaged with the plurality of planet gears, wherein the actuator is operable to rotate the sun gear and thereby adjust a ratio of a rotational speed of the crankshaft to a rotational speed of the control shaft.

17. The engine assembly of claim 16 wherein the second ring gear is not engaged with the drive gear.

18. The engine assembly of claim 16 wherein:

the plurality of planet gears are engaged with the first ring gear; and the second ring gear is fixed to the control shaft.

19. The engine assembly of claim 16 wherein the first ring gear has a first number of teeth, and the second ring gear has a second number of teeth that is different than the first number of teeth.

20. The engine assembly of claim 16 wherein the actuator rotates independent of the carrier.

* * * * *